(12) United States Patent
Saikun et al.

(10) Patent No.: US 9,774,463 B2
(45) Date of Patent: Sep. 26, 2017

(54) OPTIMIZING USER EXPERIENCES OF WEB CONFERENCES THAT SEND DATA WITH SOURCE-SPECIFIC MULTICAST AND AUTOMATIC MULTICAST TUNNELING

(71) Applicant: Cisco Technology, Inc., San Jose, CA (US)

(72) Inventors: Wang Saikun, Hangzhou (CN); Duanpei Wu, San Jose, CA (US); Chaoyu Zhang, Hangzhou (CN)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 14/843,263

(22) Filed: Sep. 2, 2015

(65) Prior Publication Data

US 2017/0063563 A1    Mar. 2, 2017

(51) Int. Cl.
*H04B 7/00* (2006.01)
*H04L 12/18* (2006.01)
*H04L 12/26* (2006.01)
*H04L 12/825* (2013.01)

(52) U.S. Cl.
CPC ........ *H04L 12/1863* (2013.01); *H04L 43/087* (2013.01); *H04L 43/0829* (2013.01); *H04L 43/0876* (2013.01); *H04L 47/25* (2013.01); *H04L 47/26* (2013.01)

(58) Field of Classification Search
CPC . H04W 76/002; H04W 76/02; H04W 76/022; H04W 76/025
USPC ................... 370/310, 329, 338, 346
See application file for complete search history.

(56) References Cited

U.S. PATENT DOCUMENTS

| 5,940,391 | A | * | 8/1999 | Malkin | ................ H04L 12/185 370/390 |
|---|---|---|---|---|---|
| 6,359,902 | B1 | * | 3/2002 | Putzolu | .............. H04N 7/17318 370/466 |
| 7,418,003 | B1 | | 8/2008 | Alvarez et al. | |
| 7,519,010 | B1 | | 4/2009 | Aggarwal et al. | |
| 7,522,599 | B1 | | 4/2009 | Aggarwal et al. | |
| 7,522,600 | B1 | | 4/2009 | Aggarwal et al. | |
| 7,532,578 | B2 | * | 5/2009 | Hanaki | ............... H04L 12/1836 370/252 |
| 7,546,082 | B2 | | 6/2009 | Chennikara et al. | |
| 7,558,219 | B1 | | 7/2009 | Aggarwal et al. | |

(Continued)

*Primary Examiner* — Dmitry H Levitan
(74) *Attorney, Agent, or Firm* — Edell, Shapiro & Finnan, LLC (57) ABSTRACT

Techniques are presented herein for a multicast server to group receivers, or user devices, with other receivers having similar characteristics, so that the group can be paired with source-specific multicast channel that is optimized specifically for the receivers of the group. The server receives information regarding hardware and network capabilities from each of the user devices. The server then groups the user devices according to their information, where each group contains user devices having hardware and network information that is similar to one another. The server then receives, at random intervals, network reports that are generated by at least one user device from at least one of the groups, where the network reports include information related to the network performance experienced by a user device. The server then adjusts the SSM channel associated with the group of user devices based on the information in the network report.

20 Claims, 6 Drawing Sheets

(56) References Cited

U.S. PATENT DOCUMENTS

| | | |
|---|---|---|
| 7,558,263 B1 | 7/2009 | Aggarwal et al. |
| 7,564,806 B1 | 7/2009 | Aggarwal et al. |
| 7,570,604 B1 | 8/2009 | Aggarwal et al. |
| 7,570,605 B1 | 8/2009 | Aggarwal et al. |
| 7,590,115 B1 | 9/2009 | Aggarwal et al. |
| 7,804,790 B1 | 9/2010 | Aggarwal et al. |
| 7,827,304 B2 | 11/2010 | Park et al. |
| 7,830,787 B1 | 11/2010 | Wijnands et al. |
| 7,924,835 B2 * | 4/2011 | Platnic ............... H04L 63/062 370/216 |
| 7,933,267 B1 | 4/2011 | Aggarwal et al. |
| 7,957,386 B1 | 6/2011 | Aggarwal et al. |
| 7,983,261 B1 | 7/2011 | Aggarwal et al. |
| 7,990,963 B1 | 8/2011 | Aggarwal et al. |
| 8,068,492 B1 | 11/2011 | Aggarwal et al. |
| 8,111,633 B1 | 2/2012 | Aggarwal et al. |
| 8,121,056 B1 | 2/2012 | Aggarwal et al. |
| 8,125,903 B2 * | 2/2012 | Godor ............... H04L 12/185 370/230.1 |
| 8,160,076 B1 | 4/2012 | Aggarwal et al. |
| 8,331,278 B2 * | 12/2012 | Song ................ H04W 72/005 370/312 |
| 8,611,346 B1 | 12/2013 | Wijnands et al. |
| 8,625,465 B1 | 1/2014 | Aggarwal et al. |
| 8,774,038 B2 | 7/2014 | Sarikaya |
| 8,817,816 B2 | 8/2014 | Sarikaya |
| 8,923,156 B1 * | 12/2014 | Lee ..................... H04L 1/0026 370/252 |
| 9,036,633 B2 | 5/2015 | Sarikaya |
| 9,288,136 B2 * | 3/2016 | Shepherd ............... H04L 45/16 |
| 2002/0085506 A1 * | 7/2002 | Hundscheidt ......... H04L 12/185 370/254 |
| 2009/0059835 A1 * | 3/2009 | Motegi ................ H04L 12/185 370/312 |

\* cited by examiner

OPTIMIZING USER EXPERIENCES OF WEB CONFERENCES THAT SEND DATA WITH SOURCE-SPECIFIC MULTICAST AND AUTOMATIC MULTICAST TUNNELING

TECHNICAL FIELD

The present disclosure relates to optimizing user experiences with web conferences, and more specifically, to grouping user devices with similar hardware and network capabilities on transmission channels that transmit data (video data, audio data, application data, etc.) of collaboration sessions.

BACKGROUND

Collaboration sessions hosted by a server often use multicasting to transmit the data of the collaboration session. As the number of attendees of collaboration sessions increase, and as the development of automatic multicast tunneling (AMT) technology has progressed, servers often use source-specific multicasts (SSM) with AMT technology to send the data of the collaboration sessions. The combination of the AMT technology with SSM reduces the outbound bandwidth and the costs for the server and the data center to host the collaboration sessions. Collaboration servers usually send data via different SSM channels having a variety of different bit rates to attendees experiencing different network conditions. However, this often causes attendees to receive data at a bit rate that is much lower than what the attendee is capable of receiving, resulting in a degraded user experience resulting from latency, poor media quality, or both.

DESCRIPTION OF EXAMPLE EMBODIMENTS

Overview

Techniques are presented herein for a server (referred to as a multicast server) to group receivers, or user devices, with other receivers having similar characteristics, so that the group can be paired with a source-specific multicast (SSM) channel that is optimized specifically for the receivers of the group. The multicast server is in communication with the user devices and is configured to send data to the user devices over multiple SSM channels. The multicast server receives information from each of the user devices, the information indicating hardware information, automatic multicast tunneling (AMT) relay information, AMT gateway information, autonomous system information, and/or network address translation information. The multicast server then groups the user devices according to their information, where each group contains user devices having similar hardware and network information. The multicast server then receives, at random intervals, network reports that are generated by at least one user device from at least one of the groups. The network report may include information related to the network performance experienced by the user device, such as packet loss ratio, jitter, and/or latency. The server then adjusts the SSM channel associated with the group of user devices that is represented by the network report based on the information in the network report.

Example Embodiments

Multicast involves communication from one source, such as a server, to a group of destinations simultaneously, such as a group of receivers that are designated to receive the multicast communication. Moreover, many sources use source-specific multicast (SSM) and automatic multicast tunneling (AMT) techniques to reach a large number of destinations/receivers while reducing the demand on the network. SSM is a method for delivering the data of the multicast communication to receivers over SSM channels, where the SSM channels include the pair of a source address and a receiver address in which only the specific source in the source address can send data to the receivers. However, receivers on a unicast channel are unable to receive data sent over SSM channels. AMT provides a method to tunnel SSM data over a unicast channel through the use of AMT relays and AMT gateways. The use of SSM techniques with AMT in multimedia applications, such as collaboration (online web conference) sessions, can reduce the outbound bandwidth and the cost of the server at the data center. While servers send data in different SSM channels with various different bit rates to satisfy receivers located in different networks, it becomes difficult to optimize each one of the SSM channels to a bit rate that satisfies all of the receivers of an SSM channel. Moreover, the servers are not capable of sending data over SSM channels for each one of the receivers. Thus, many receivers are not able to optimize their experience because they are not able to connect to an SSM channel that matches their respective inbound bandwidth capabilities. The result is receivers that are receiving data via an SSM channel with a bit rate that is much lower than the bit rate the receiver is capable of receiving. This results in longer delays and/or poor quality of media.

Figure 1:
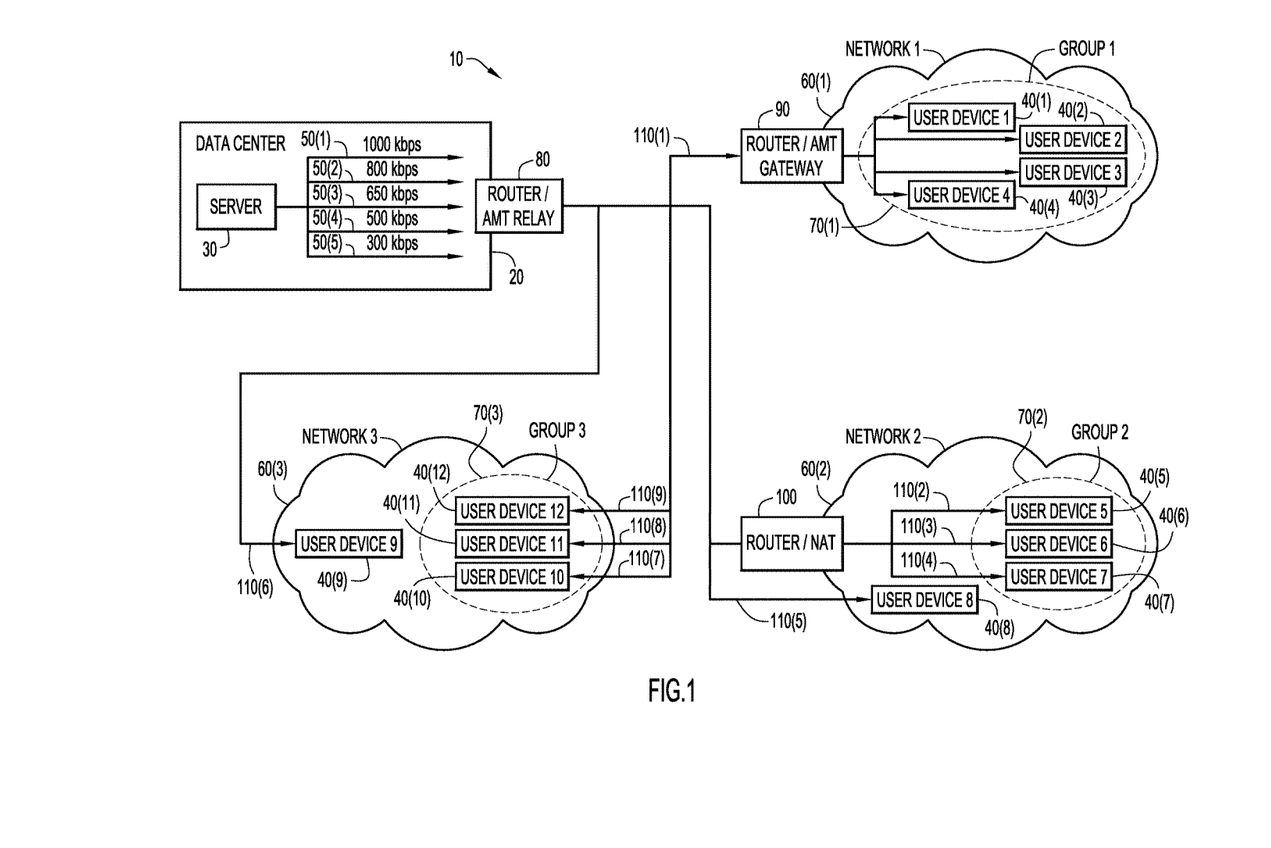
FIG. 1 is a block diagram of an environment for optimizing users on different transmission channels for a collaboration session, according to an example embodiment.

An example embodiment of a collaboration optimization system 10 configured to optimize a plurality of user devices of a collaboration session into groups for receiving a multicast is depicted in FIG. 1. The collaboration optimization system 10 is a system that includes a data center 20, which further contains a multicast server 30. The multicast server 30 is configured to send data to a plurality of user devices 40(1)-40(12) via a plurality of channels 50(1)-50(5). The channels 50(1)-50(5) may be source-specific multicast (SSM) channels. The data center 20 and the multicast server 30 may be configured to send the data of an online collaboration session over the plurality of SSM channels 50(1)-50(5). The online collaboration multicast data may be video data, audio data, etc. FIG. 1 further illustrates a first network 60(1), a second network 60(2), and a third network 60(3). The user devices 40(1)-40(12) are located throughout the networks 60(1)-60(3). The first network 60(1) may contain four user devices 40(1)-40(4). The second network 60(2) may contain another set of four user devices 40(5)-40(8). The third network 60(3) may also contain the last four user devices 40(9)-40(12). Each of the networks 60(1)-60(3) may exhibit different network conditions with regard to the user devices 40(1)-40(12), how the user devices 40(1)-40(12) are grouped, and how the user devices 40(1)-40(12) receive the multicast data from the multicast server 30. As illustrated, the four user devices 40(1)-40(4) in the first network 60(1) may be grouped together into a first group 70(1). Moreover, the user devices 40(5)-40(7) in the second network 60(2) may be grouped together in a second group 70(2). The user device 40(8) is part of the second network 60(2), the user device 40(8) is not part of a group. In addition, FIG. 1 illustrates that the user devices 40(10)-40(12) in the third network 60(3) may be grouped together in a third group 70(3), while the user device 40(9) may not be part of a group.

As further illustrated in in FIG. 1, the data center 20 contains a router/AMT relay device 80 deployed at the edge of the data center 20. The router/AMT relay device 80 is capable of receiving AMT requests from AMT gateway devices and relay the data from one of the SSM channels 50(1)-50(5) to the AMT gateway device via an AMT tunnel. The router/AMT relay device 80 serves as one end of an AMT tunnel, while the AMT gateway device serves as the other end of the AMT tunnel. The communication between the multicast server 30 and the router/AMT relay device 80 is multicast and utilizes the SSM channels 50(1)-50(5). The communication between the router/AMT Relay device 80 and the AMT gateway devices is unicast and utilizes AMT tunnels. The communication between the router/AMT Relay 80 and the AMT gateway devices reduces the outbound bandwidth of the data center 20 and the inbound bandwidths of the networks in which the AMT gateway devices are deployed. Further illustrated in FIG. 1, the first network 60(1) may include a router/AMT gateway device 90 deployed on the edge of the first network 60(1). The router/AMT gateway device 90 is configured to send data it receives to the four user devices 40(1)-40(4) of the first network 60(1). Moreover, the four user devices 40(1)-40(4) may together form the first group 70(1) because they are all in communication with the same router/AMT gateway device 90.

FIG. 1 further illustrates a router/Network Address Translation (NAT) device 100 deployed in the second network 60(2). The user devices 40(5)-40(7) illustrated in FIG. 1 are all in communication with the router/NAT device 100, and thus user devices 40(5)-40(7) share the same or similar network conditions. However, the router/NAT device 100 is not an AMT gateway device, which results in each one of the user devices 40(5)-40(7) having built-in AMT gateway functionality. Thus, user devices 40(5)-40(7) may be configured to act as AMT gateway devices, where each of these user devices 40(5)-40(7) serves as an end of an AMT tunnel.

While the second network 60(2) includes the user device 40(8), the user device 40(8) is not configured to communicate with the router/NAT device 100 like that of the user devices 40(5)-40(7). Thus, the user device 40(8) does not have the same or similar network conditions as the user devices 40(5)-40(7) of the second group 70(2) and is not a member of the second group 70(2). However, similar to the user devices 40(5)-40(7), the user device 40(8) is not in communication with an AMT gateway device. Therefore, the user device 40(8) may have AMT gateway functionality built in, allowing the user device 40(8) to be configured to act as an AMT gateway device and serve as one end of an AMT tunnel.

In addition, FIG. 1 illustrates that the user devices 40(9)-40(12) in the third network 60(3) are not in communication with an AMT gateway device like the user devices 40(1)-40(4) of the first network 60(1). Thus, similar to the user devices 40(5)-40(8) of the second network 60(2), the user devices 40(9)-40(12) may have AMT gateway functionality built-in that allows user devices 40(9)-40(12) to be configured to act as an AMT gateway device and serve as one end of an AMT tunnel. Moreover, the user devices 40(10)-40(12) may form the third group 70(3) of user devices because these three user devices 40(10)-40(12) are in the same general location within the third network 60(3). Thus, the user devices 40(10)-40(12) may have similar network conditions or capabilities with the multicast server 30. The user device 40(9) may be located at a location different from that of the user devices 40(10)-40(12) such that it contains different network conditions or capabilities with the multicast server 30 than the user devices 40(10)-40(12). Because of these differences, the user device 40(9) does not form part of the third group 70(3).

Further illustrated in FIG. 1 are AMT tunnels 110(1)-110(8). Each of these AMT tunnels 110(1)-110(9) includes router/AMT relay device 80 as one end of the AMT tunnels 110(1)-110(8). The first AMT tunnel 110(1) is established between the router/AMT Relay device 80 and the router/AMT gateway device 90 of the first network 60(1). The AMT tunnels 110(2)-110(5) are established between the router/AMT relay device 80 and the user devices 40(5)-40(8), respectively. Finally, the AMT tunnels 110(6)-110(9) are established between the router/AMT relay device 80 and the user devices 40(9)-40(12), respectively. As stated previously, the user devices 40(5)-40(12) may have AMT gateway functions built-in that enable these user devices 40(5)-40(12) to serve as AMT gateway devices.

Moreover, each of the networks 60(1)-60(3) may be, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. The number of user devices 40(1)-40(12), SSM channels 50(1)-50(5), networks 60(1)-60(3), groups 70(1)-70(3), and AMT tunnels 110(1)-110(9) depicted in FIG. 1 is for example purposes only, and it is noted that the networks 60(1)-60(3) connecting the user device(s) 40(1)-40(12), SSM channels 50(1)-50(5), multicast server 30, and AMT tunnels 110(1)-110(9) can support communications and exchange of data between any number of user devices, SSM channels, multicast servers, and AMT tunnels.

Some examples of user devices 40(1)-40(12) include any type of computing device including, without limitation, personal computer (PC) devices, such as stationary (e.g., desktop) computers, laptop computers, or any other type of mobile computing device such as cellular (smart) mobile phones (e.g., cell phones, also referred to as mobile phones), note pads, tablets, personal data assistant (PDA) devices, and other portable media devices. The user devices 40(1)-40(12), the multicast server 30, and other devices of the collaboration system 10 can utilize any suitable operating system to transfer of data between the multicast server 30 of the data center 30 and the user devices 40(1)-40(12). In addition, the techniques described herein for optimizing the user devices 40(1)-40(12) of a collaboration session via the collaboration optimization system 10 can be integrated with any suitable type of commercial software products.

Figure 2:
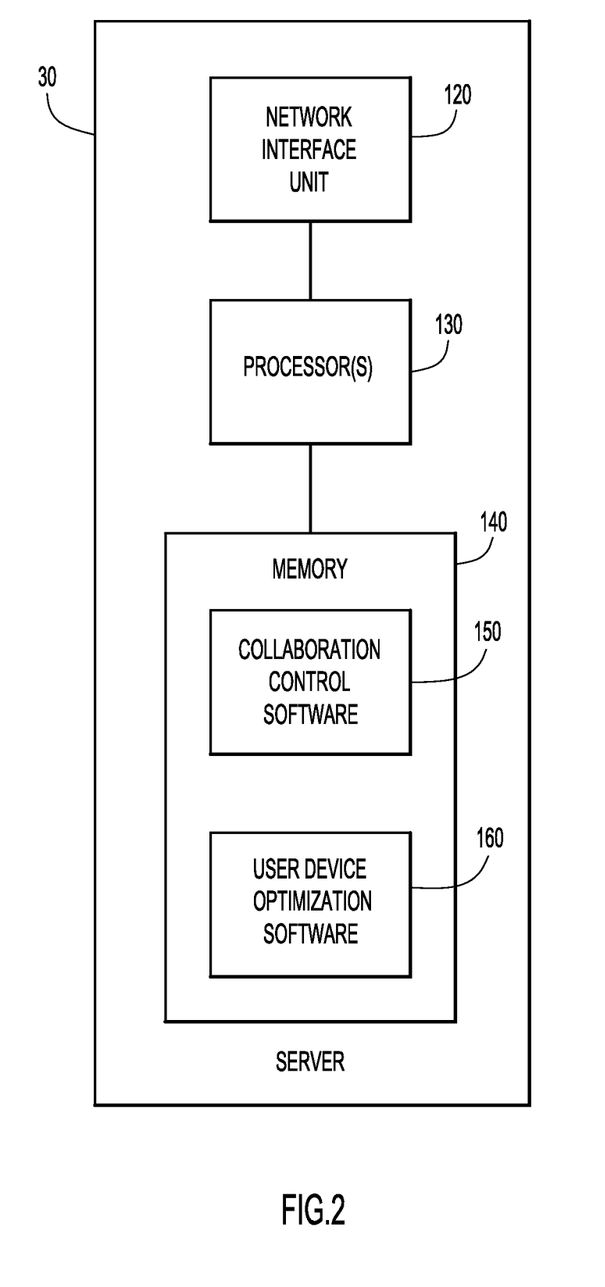
FIG. 2 is a block diagram of a server illustrated in FIG. 1, wherein the server is configured to transmit data in such as a manner so as to optimize the user experience at user devices, in accordance with an example embodiment.

Illustrated in FIG. 2 is an example block diagram of the multicast server 30 that is located within the data center 20. The multicast server 30 may be configured to perform the techniques presented herein. The multicast server 30 includes a network interface unit 120, a processor(s) 130, and a memory 140. The network interface unit 120 is configured to enable network communications over a network. While conceptually illustrated as a "network interface unit," it will be appreciated that a physical device may contain more than one network interface unit or type of interface to communicate with other devices within a network. For example, network interface unit 120 may include a wireless network interface unit to facilitate wireless communication over networks 60(1)-60(3) illustrated in FIG. 1.

The processor(s) 130 may be embodied by one or more microprocessors or microcontrollers, and executes software instructions stored in memory 140 for collaboration control software 150 and user device optimization software 160 in accordance with the techniques presented herein in connection with FIGS. 1 and 3-6.

Memory 140 may include one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 140 may comprise one or more tangible (e.g., non-transitory) computer readable storage media (e.g., a memory device) encoded with software comprising computer executable instructions, and when the software is executed by the processor(s) 130, the processor(s) 130 is operable to perform the operations described herein in connection with the collaboration control software 150 and the user device optimization software 160. In other approaches, collaboration control software 150 and the user device optimization software 160 are stored remotely, external to the multicast server 30, but accessible by the processor(s) 130. The collaboration control software 150 enables the multicast server 30 to send data (e.g., audio data, video data, etc.) of the collaboration session to a plurality of user devices. Moreover, as explained in further detail below, the user device optimization software 160 enables the multicast server 30 to group together user devices that share similar hardware and network conditions and then assign the group to a dedicated SSM channels that is configured to the hardware and network conditions of the user devices of the group. This enables each group of user devices to have an experience of the collaboration session that is optimized to the capabilities of the user device.

The functions of the processor(s) 130 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 2 shows that the multicast server 30 may be embodied as a dedicated physical device, it should be understand that the functions of the multicast server 30 may be embodied as software running in a data center/cloud computing system, together with numerous other software applications.

Figure 3:
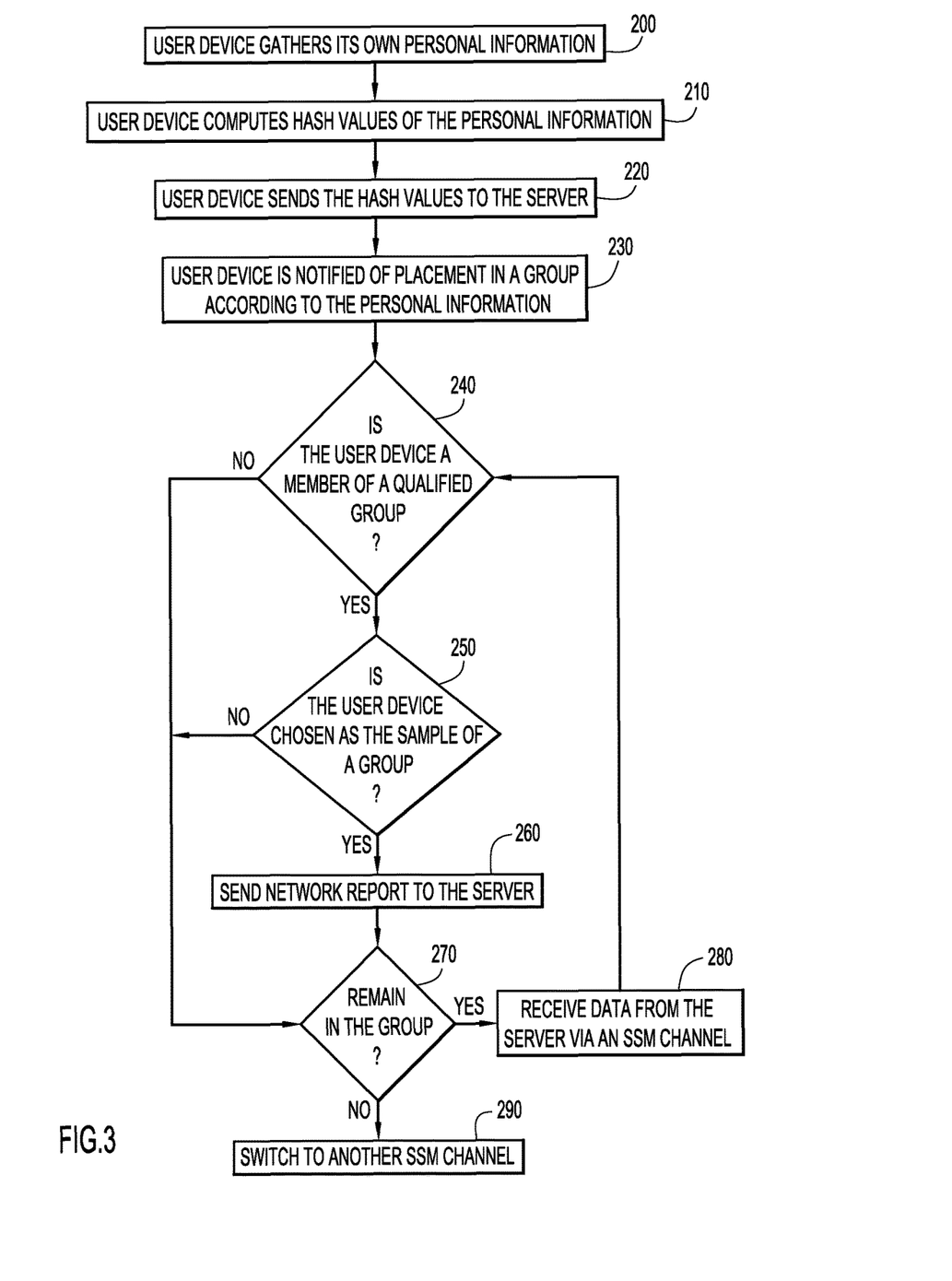
FIG. 3 is a flow diagram depicting assignment of a user device to a source-specific multicast channel, in accordance with an example embodiment.

FIG. 3 illustrates a flow diagram that depicts, from the perspective of a user device, the user device being assigned to a group, and ultimately to an SSM channel, by the user device optimization software 160 of the multicast server 30. Reference is also made to FIGS. 1 and 2 for purposes of the description of FIG. 3. As previously explained, the user device optimization software 160 is configured to determine the most suitable group and SSM channel for a user device based on a variety of parameters. At 200, the user device gathers its own personal information. This information includes any specific hardware information, such as the performance capabilities of the central processing unit (CPU) of the user device, the type and capacity of the memory of the user device, the network adapter of the user device, etc. The information gathered at 200 may further include any AMT relay information and any AMT gateway information. AMT relay information may be gathered if the user device functions as an AMT gateway to receive data from the AMT relay 80 of the data center 20. For example, as illustrated in FIG. 1, and as previously explained, the user devices 40(5)-40(12) may have AMT gateway functions built-in that enable these user devices 40(5)-40(12) to serve as their own AMT gateway devices. These user devices 40(5)-40(12) would each gather information regarding their AMT gateway functionality. In addition, AMT gateway information gathered at block 200 may be gathered if the user device receives data from a dedicated AMT gateway device. For example, as illustrated in FIG. 1, the first network 60(1) includes a router/AMT gateway device 90 deployed on the edge of the first network 60(1), where the router/AMT gateway device 90 is configured to send data to the four user devices 40(1)-40(4) of the first network 60(1). These user devices 40(1)-40(4) would then gather information regarding the AMT gateway device 90 with which they are in communication. Additional information gathered by the user device at 200 may include other network information, such as autonomous system information, NAT information, location on a network, etc. For example, FIG. 1 illustrates that the user devices 40(5)-40(7) are in communication with the router/NAT device 100. These user devices 40(5)-40(7) would then further gather information regarding the router/NAT device 100. In another example, the user devices 40(10)-40(12), as illustrated in FIG. 1, are in close proximity to one another, resulting in these user devices 40(10)-40(12) gathering information regarding their location in the third network 60(3).

At 210, the user device then computes hash values of the personal information for that user device. Each type of personal information from the user device receives a separate hash value. For example, the AMT relay address may be hashed to a value, and the AMT gateway address may be hashed to another value. Thus, the user device computes multiple hash values for all of its personal information. The calculated hash values of the personal information of a user device may be of any bit length, e.g., SHA256 or SHA512 bits. Hash values should have a significantly large bit value in order to have a sufficiently lower chance of collision with hash values of other user devices. This is especially important for collaboration sessions with a large amount of user devices. In addition, the hash values protect the privacy of the user device. At 220, the user device then sends the hash files to the server 30. Once the server 30 receives the hash file from a user device, the server 30 runs the user device optimization software 160 to determine if the user device should be placed in a multicast group, where the determination is made based on the personal information of the user device. This process is explained below in connection FIG. 4. At 230, the user device is notified by the multicast server 30 if the user device has been placed in a group based on the personal information from the user device. As illustrated in FIG. 1, the user devices 40(1)-40(4) were placed in the first group 70(1), the user devices 40(5)-40(7) were placed in the second group 70(2), and the user devices 40(10)-40(12) were placed in the third group 70(3). The user devices 40(1)-40(4) may be grouped into the first group 70(1) because the user devices 40(1)-40(4) are all connected to the same AMT gateway device 90. In addition, the user devices 40(1)-40(4) may also have similar hardware performance capabilities and may be located in close proximity to one another. Furthermore, the user devices 40(5)-40(7) may be grouped into the second group 70(2) because the user devices 40(5)-40(7) are all connected to the same router/NAT device 100. The user devices 40(5)-40(7) may also all have similar hardware performance capabilities and may be located in close proximity to one another. The user device 40(8) may not be part of a group because the user device 40(8) is not connected to the router/NAT device 100 like that of the user devices 40(5)-40(7). The user device 40(8) may also have significantly different hardware capabilities than that of the user devices 40(5)-40(7). Furthermore, the user devices 40(10)-40(12) may be grouped into the third group 70(3) because the user devices 40(10)-40(12) may all have similar hardware capabilities and may be located in close proximity to one another. Conversely, the user device 40(9) may have significantly different hardware capabilities and/or may not be located in proximity to the user devices 40(10)-40(12), and thus the user device 40(9), as illustrated in FIG. 1, may not be placed in a group.

At block 240, the user device may determine if the user device is part of a qualified group. Each group may have a certain threshold set for a minimum number of members of the group, which may be set by the multicast server 30. If the group meets or exceeds the threshold that is set, the group will be considered a qualified group by the multicast server 30. If the group fails to meet the threshold, the group will not be considered a qualified group by the multicast server 30. Additionally, the multicast server 30 may create a dedicated SSM channel for each qualified group. The threshold set by the multicast server 30 is used to control the total number of SSM channels the multicast server 30 utilizes in order to keep the advantages of the multicast. If the number of SSM channels exceeds the capabilities of the multicast server 30, the bandwidth of the multicast server 30 and the data center 20 may be overloaded. If, at 240, the user device is a member of a qualified group, then the user device must determine if the multicast server 30 has selected the user device as the sample of the qualified group. The process of the multicast server 30 selecting a user device as a sample of a qualified group is described below in connection with FIG. 4. If, at 250, the user device is selected as the sample of the qualified group, then at 260, the user devices sends a network report to the multicast server 30, where the network report contains information regarding the network conditions the user device is experiencing for the multicast from the multicast server 30. The network report may include information regarding the inbound bandwidth, packet loss ratio, jitter, latency, and/or any other information regarding the network condition. In some embodiments, the network report may be sent to the multicast server 30 at random intervals to avoid overloading the multicast server 30 with information. In other embodiments, the network reports may be sent to multicast server 30 at predetermined intervals, where the intervals are set at a frequency that does not overload the multicast server 30. Furthermore, the network report may serve as a representation of the network conditions experienced by the group of which the user device is a member.

After the user device sends to the multicast server 30 the network report at 260, or it is determined that the user device is not part of a qualified group at 240, or it is determined that the user device has not been chosen as the sample for the qualified group at 250, the user device decides, at block 270, whether or not to remain in the qualified group to which the multicast server 30 has assigned the user device. While the multicast server 30 has the ability, through the user device optimization software 160, to determine the group best suited for the user device, the user device ultimately has the decision whether or not to stay in the assigned group. In another embodiment, once the multicast server 30 has decided which group the user device should be a member of, the multicast server may provide the user device with information indicating the best suited group for that user device. The user device may then be able to decide whether or not to join the group that the multicast server 30 has selected.

At 270, if the user device determines to remain in the qualified group, then at 280 the user device will continue to receive the data from the multicast server 30 via the SSM channel selected for the qualified group of which the user device is a member. However, if, at 270, the user device determines that it no longer wishes to be a member of the qualified group it is currently a member of, then, at 290, the user device may switch to another SSM channel that the user devices has determined will provide a better experience for the collaboration multicast. The process of switching from one SSM channel to another is further described below in connection with FIG. 5.

Figure 4:
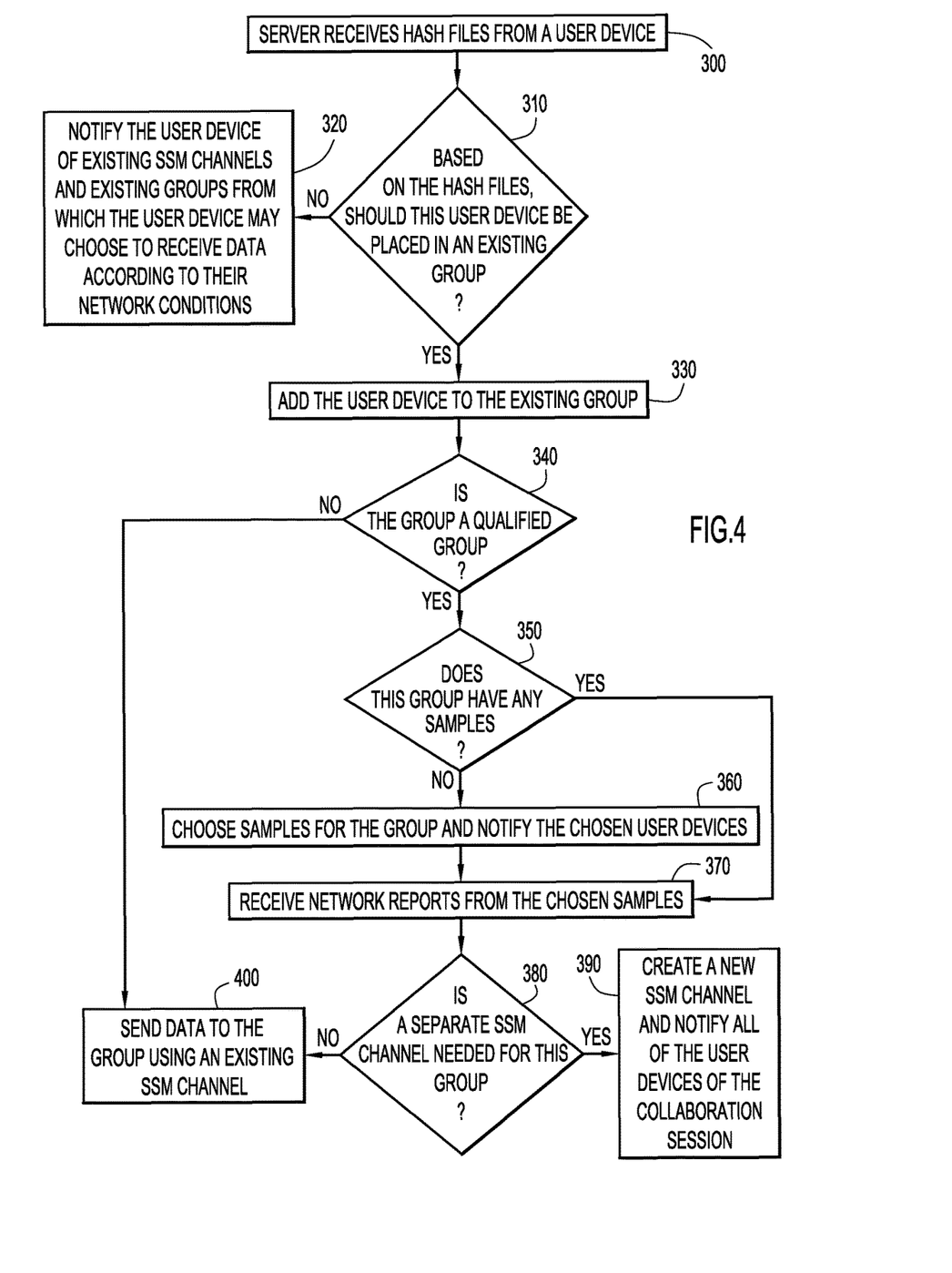
FIG. 4 is a flow diagram depicting in more detail operations performed by the server to assign the user device to a group and adjust a source-specific channel for the group, according to an example embodiment.

Turning to FIG. 4, the operation of the user device optimization software 160 running on the multicast server 30 is now described. Reference is also made to FIGS. 1-3 for purposes of the description of FIG. 4. As explained previously, the user device optimization software 160 is configured to determine the most suitable group and SSM channel for a user device based on a variety of parameters. At 300, the multicast server 30 receives the hash files from the user device, as explained previously, containing information regarding the personal information of the user device. At 310, the multicast server 30 then makes a determination as to whether or not the user device should be placed in an existing group. In making the determination at 310, the multicast server 30 takes into consideration the specific hardware capabilities of the user device, the AMT relay information of the user device, the AMT gateway information of the user device, and other network information regarding the user device in view of similar information from other user devices already placed, or in the process of being placed, in a group. If, at 310, the multicast server 30 determines that the user device does not belong in an existing group, the multicast server 30, at 320, may notify the user device of the existing SSM channels and existing groups from which the user device may choose to receive data according to their network conditions. For example, as illustrated in FIG. 1, the user devices 40(5)-40(7) are part of the second group 70(2). When the user device 40(8) joins the multicast and sends its hashed information to the multicast server 30, the multicast server 30 may determine that the user device 40(8) may not belong in the second group 70(2) even though the user device 40(8) is part of the second network 60(2) like the user devices 40(5)-40(7).

If, at 310, the multicast server 30 makes the determination that the user device does belong in an existing group, then the multicast server 30, at block 330, adds the user device to the existing group. As illustrated in FIG. 1, if the first group 70(1) was already existing with the user devices 40(1)-40(3)

being part of the first group 70(1), and the user device 40(4) has just sent the multicast server 30 its hashed information, the multicast server 30 may determine that the user device 40(4) belongs in the first group 70(1) because the user device 40(4) is connected to the same AMT gateway device 90 as the other user devices 40(1)-40(3) of the first group 70(1).

At 340, the multicast server 30 then determines whether or not the group that user device was added to is a qualified group. As previously explained, each group may have a certain threshold set for a minimum number of members of the group, which may be set by the multicast server 30. If the group meets or exceeds the threshold that is set, the group will be considered a qualified group by the multicast server 30. If the group fails to meet the threshold, the group will not be considered a qualified group by the multicast server 30. The multicast server 30 may create a dedicated SSM channel for each qualified group. If a group is not a qualified group, the group may not receive a dedicated SSM channel. For example, if the threshold set by the multicast server 30 is that the group must contain at least three user devices to be considered a qualified group, then the groups 70(1)-70(3) may be considered qualified groups, and the multicast server 30 may create a dedicated SSM channel for each group 70(1)-70(3). The first group 70(1) may receive the first SSM channel 50(1), which transmits the collaboration session at 1000 kilobytes per second (kbps), because the hardware information received from the user devices 40(1)-40(4) by the multicast server 30 may indicate that the user devices 40(1)-40(4) are capable of handling a bit rate of 1000 kbps.

Moreover, the multicast server 30 may have initially transmitted the collaboration session to the user devices 40(5)-40(8) of the second network 60(2) via the third SSM channel 50(3) prior to the forming of the second group 70(2). As illustrated in FIG. 1, the third SSM channel 50(3) may transmit the collaboration session at 650 kbps. Once the user devices 40(5)-40(7) were placed into the second group 70(2), the multicast server 30 may have created the second SSM channel 50(2) to transmit the collaboration session to the second group 70(2) at 800 kbps because the hardware information of user devices 40(5)-40(7) received by the multicast server 30 may indicate that the user devices 40(5)-40(7) are capable of handling an increased bit rate of 800 kbps instead of only 650 kbps. The multicast server 30 may continue to transmit the collaboration session data to the remaining user devices, which in this example is only the user device 40(8), on the second network 60(2) via the third SSM channel 50(3).

Furthermore, the multicast server 30 may have initially transmitted the collaboration session data to the user devices 40(9)-40(12) of the third network 60(3) via the SSM channel 50(5) prior to the forming of the third group 70(3). As illustrated in FIG. 1, the SSM channel 50(5) may transmit the collaboration session data at 300 kbps. Once the user devices 40(10)-40(12) were placed into the third group 70(3), the multicast server 30 may have created the SSM channel 50(4) to transmit the collaboration session to the third group 70(3) at 500 kbps because the hardware information for user devices 40(10)-40(12) received by the multicast server 30 may indicate that the user devices 40(10)-40(12) are capable of handling a bit rate of 500 kbps instead of only 300 kbps. The multicast server 30 may continue to transmit the collaboration session data to the remaining user devices, which in this example is only the user device 40(9), on the third network 60(3) via the SSM channel 50(5).

As explained, the user devices 40(5)-40(7), 40(10)-40(12) of the second and third groups 70(2), 70(3) were receiving the collaboration session data at a lower incoming bandwidth prior to being placed in their respective groups 70(2), 70(3). Thus, once the user devices 40(5)-40(7), 40(10)-40(12) were placed in the second and third groups 70(2), 70(3), respectively, the user devices 40(5)-40(7), 40(10)-40(12) received the data of the collaboration session at an bit rate that is more optimized for the capabilities of user devices 40(5)-40(7), 40(10)-40(12).

If at 340, the multicast server 30 determines that the group that the user device was just added to is a qualified group, the multicast server 30 then determines, at 350, if the qualified group has a designated sample. As previously explained, the sample of the qualified group is a member of a qualified group that sends network reports at random intervals to the multicast server 30, where the network reports serve as a representation of the network conditions experienced by the qualified group. If the multicast server 30 determines that the qualified group does not have a sample, then at 360, the multicast server 30 selects a user device from the qualified group as a sample and notifies the user device that they have been chosen as the sample of the qualified group. The multicast server 30 selects the user device of a qualified group that has the characteristics and capacity that can represent the majority of the other user devices in the same qualified group. In other words, the multicast server 30 selects the user device whose hardware capabilities are most similar to the majority of other user devices of the same qualified group.

After the sample has been chosen by the multicast server 30, at 360, or, at 350, the qualified group already has a sample representing the qualified group, the multicast server 30 then, at 370, receives the network reports from the sample of the qualified group. As previously, explained, the network reports from the sample of the qualified group include information that represent the network conditions of the collaboration multicast transmission for the SSM channel of the qualified group. The network report may include inbound bandwidth, packet loss ratio, jitter, latency, etc.

Once the multicast server 30 receives the network report from the sample of the qualified group the multicast server then, at 380, determines if the SSM channel needs adjustment for the qualified group. The multicast server 30 makes this determination based on the network reports received from the sample of the qualified group. The multicast server 30 may decide whether to open or close an SSM channel based on the network reports received from the samples and the current SSM channels available. If the multicast server 30, at 380, determines that an existing SSM channel is not sufficient for the qualified group, then the multicast server 30, at 390 creates a new SSM channel and notifies all of the user devices of the collaboration session that the new SSM channel has been created. For example, as illustrated in FIG. 1, if the user devices 40(5)-40(8) of the second network 60(2) were all receiving on the SSM channel 50(3), and then the second group 70(2) was created containing user devices 40(5)-40(7), the multicast server 30 may create the second SSM channel 50(2) with a higher bit rate for the second group 70(2) based on the network reports received from the sample of the second group 70(2). Thus, the second group 70(2) would then receive the collaboration multicast transmission on the second SSM channel 50(2), which is optimized for the user devices 40(5)-40(7) of the second group. In addition, the notification provides the user devices that do not belong to any qualified group with notice of an addition SSM channel from which these user devices may choose to receive the data of the collaboration session.

Conversely, if the multicast server 30, at 380, determines that an existing SSM channel is already sufficient for the qualified group, then the multicast server 30, at 400, would continue sending the collaboration multicast data to the qualified group via the already established SSM channel. For example, as illustrated in FIG. 1, the multicast server 30 has designated the first SSM channel 50(1) to the first group 70(1). Once the multicast server 30 receives a new network report from the sample of the first group 70(1), and determines that the first SSM channel 50(1) remains sufficient based on the information in the network report, then the multicast server 30 will continue to send the collaboration data to the first group 70(1) via the first SSM channel 50(1). Furthermore, the multicast server 30 may be able to define the particular forward error control (FEC) rate for each SSM channel based on the packet loss ratio reported in the network report from the sample of a group. The network reports may further allow the multicast server 30 to define the particular sending behavior of an SSM channel by adjusting the bit rate, whether or not to send the data via burst transmission, etc.

Figure 5:
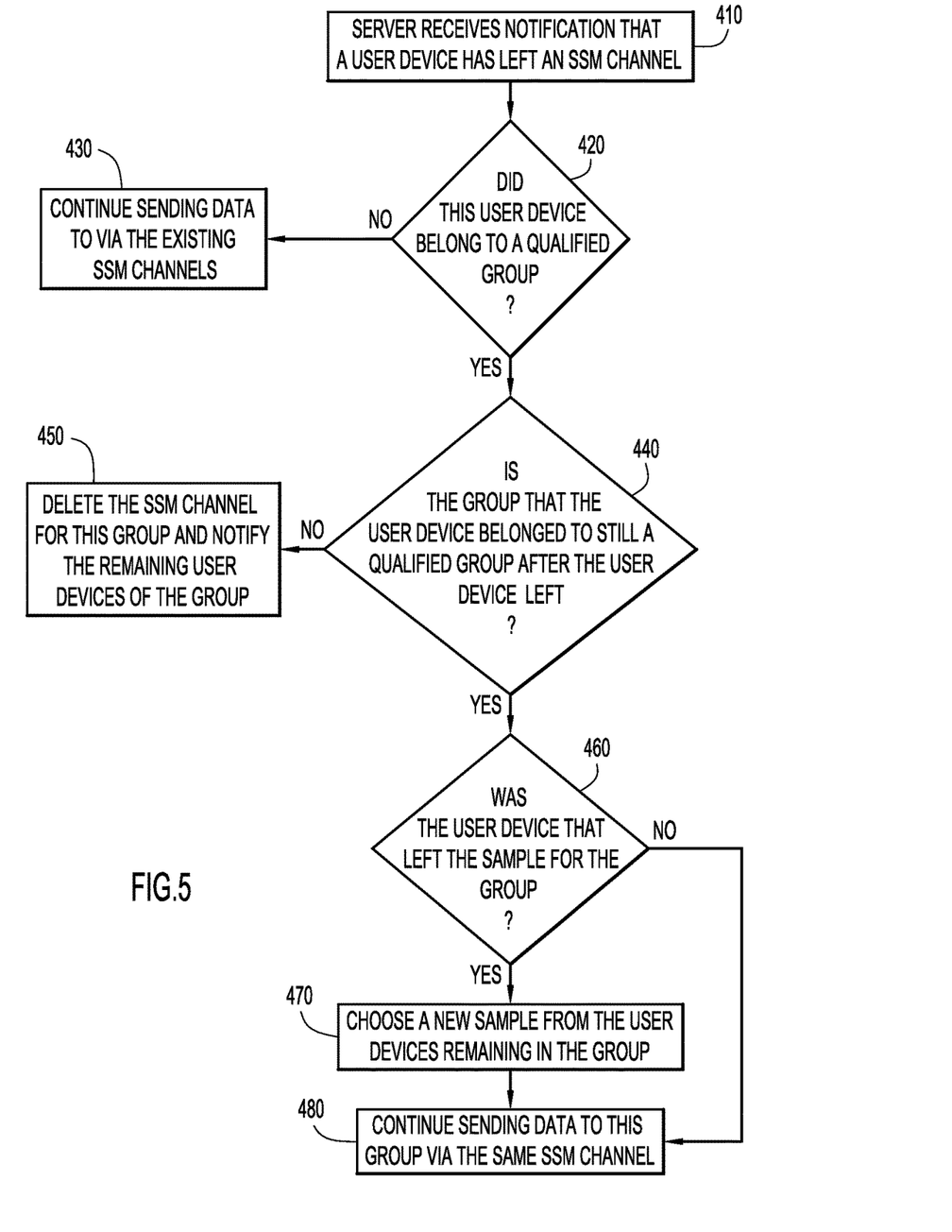
FIG. 5 is a flow diagram depicting the server adjusting the group after a user device has left the collaboration session, in accordance with an example embodiment.

Turning to FIG. 5, the operation of the user device optimization software 160 when a user device leaves an SSM channel, is now described. Reference is also made to FIGS. 1-4 for purposes of the description of FIG. 5. As explained previously with reference to FIG. 3, a user device has the option, or decision, to remain in a specific group that is assigned by the multicast server 30. In addition, instead of a user device simply switching from one group to another group, a user device may also leave the group entirely, which means, if the user device was a member of a group, the user device has then left that group. In the event that a user device leaves a group, the multicast server 30, at 410, receives a notification that the user device has left an SSM channel. The multicast server 30, at 420, then determines if the user device belonged to a qualified group. In the event that the multicast server 30 determines that the user device did not belong to a qualified group, the multicast server 30, at 430, continues transmitting the collaboration session via the existing SSM channels. Conversely, if the multicast server 30, at 420, determines that the user device did belong to a qualified group, the multicast server 30, at 440, must then determine if the qualified group is still a qualified group after the user device has left. For example, as illustrated in FIG. 1, if the multicast server 30 set the threshold to three members for a qualified group, and one of the user devices 40(10)-40(12) leaves the third group 70(3), then the third group 70(3) would no longer be considered a qualified group. If, at block 440, the multicast server 30 determines that the qualified group is no longer a qualified group after the user device has left, at 450, the multicast server 30 deletes the SSM channel that was dedicated for the qualified group and notifies the user devices remaining in the group that the SSM channel is not longer available. However, if, at 440, the multicast server 30 determines that the qualified group is still a qualified group after the user device has left, at 460, the multicast server 30 must then determine if the user device that left the qualified group served as the sample device for the qualified group.

At 460, if the multicast server 30 determines that the user device that left the qualified group was the sample device of the qualified group, the multicast server 30, at 470, selects a new sample for the qualified group based on the remaining user devices in the group. As previously explained, the multicast server 30 selects the user device whose hardware capabilities are most similar to the majority of other user devices of the same qualified group as the sample of a qualified group. Once the multicast server 30 selects a new sample for the qualified group, the multicast server 30, at 480, will then continue to send the data of the collaboration session to the qualified group via the dedicated SSM channel. In addition, if, at 460, the multicast server 30 determined that the user device that left the qualified group was not the sample device for the qualified group, then the multicast server 30, at 480, continues to send the data of the collaboration session to the qualified group via the dedicated SSM channel.

Figure 6:
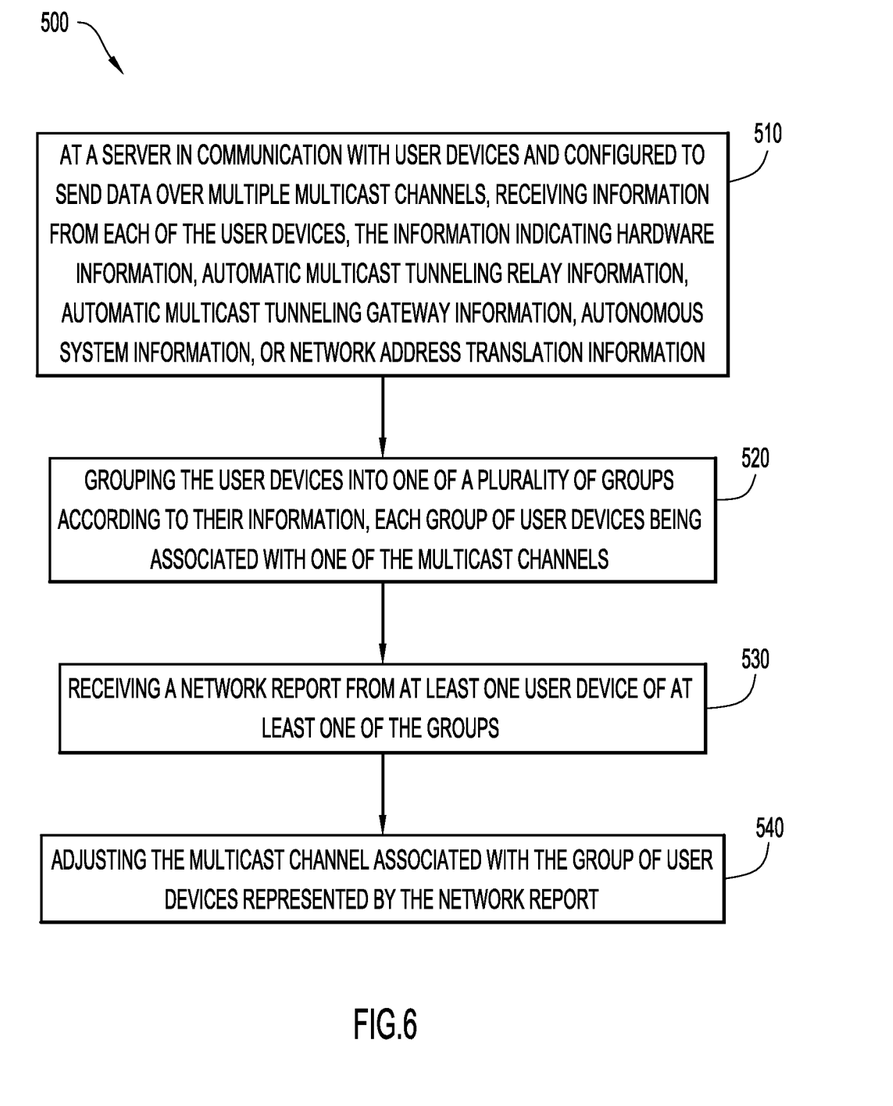
FIG. 6 an example block diagram of the server illustrated in FIGS. 1 and 2, and configured to perform the methods presented herein, in accordance with an example embodiment.

An example embodiment of a high-level process 500 performed by the multicast server 30 for optimizing the experience of user devices for a collaboration session transmitted by the multicast server 30 is depicted in the flowchart of FIG. 6. Reference is also made to FIGS. 1-5 for purposes of the description of FIG. 6. At 510, the multicast server, which is in communication with a plurality of user devices and configured to send data of a collaboration session to the plurality of user devices over multiple multicast channels, e.g., SSM channels, receives information from each of the user devices. As previously explained, the user devices may send their personal information related to their hardware capacity, AMT relay information, AMT gateway information, and other network information. At 520, the multicast server may then group the plurality of user devices according to the information they have sent to the multicast server. Furthermore, at step 520, the multicast server assigns each group of user devices to one of the multicast channels. The multicast server may group the user devices in accordance with the steps performed by the user device optimization software 160, as illustrated in the example embodiment of FIG. 4. Upon determining the grouping the user devices and assignment of each of the groups to a channel, at 530, the multicast server receives a network report from one of the user devices of one of the groups. As previously explained, the network reports include information regarding the network conditions experienced by a user device which includes inbound bandwidth, packet loss ratio, jitter, latency, etc. At 540, the multicast server adjusts the multicast channel for each of the groups based on the content and information within the network reports received by the multicast server.

The techniques presented herein provide a computer-implemented method of determining how to optimize the collaboration session experience for user devices by assigning the user devices to groups in which the user devices of the group contain similar hardware and networking capabilities. By placing user devices of similar capabilities into groups, the multicast server is able to dedicate a source-specific multicast channel to each of these groups, where the source-specific multicast channels are optimized for the user devices of the group. Without placing user devices into groups, a multicast server may have a limited number of source-specific multicast channels for all of the user devices of a network, and the multicast server will set the bit rate low enough to enable as many user devices on the network to subscribe to the source-specific multicast channel. Thus, user devices that have network and hardware capabilities of handling bit rates with a larger capacity may have a bad experience for the collaboration session because of long delays, bad media quality, or both. Furthermore, the multicast server is not able to dedicate a different source-specific multicast channel with specific bit rates for each of the user devices because the multicast server would then lose the advantages achieved through multicasting. Grouping user devices that have similar capabilities reduces the outgoing bandwidth of the multicast server.

In another form, an apparatus is provided comprising a network interface unit configured to enable communications with a plurality of user devices and send data over multiple multicast channels; a memory; and a processor configured to: receive information from each of the user devices, the information indicating hardware information, automatic multicast tunneling (AMT) relay information, AMT gateway information, autonomous system information, or network address translation information; group the user devices into one of a plurality of groups according to their information, each group being associated with one of the multicast channels; receive a network report from at least one user devices of at least one of the groups; and adjust the multicast channel associated with the group of user devices represented by the network report.

In still another form, one or more computer readable storage media are provided for a server in communication with user devices and configured to send data over multiple multicast channels to the user devices, the computer readable storage media being encoded with software comprising computer executable instructions, and when the software is executed, operable to: receive information from each of the user devices, the information indicating hardware information, automatic multicast tunneling (AMT) relay information, AMT gateway information, autonomous system information, or network address translation information; group the user devices into one of a plurality of groups according to their information, each group being associated with one of the multicast channels; receive a network report from at least one user device of at least one of the groups; and adjust the multicast channel associated with the group represented by the network report.

The above description is intended by way of example only. Various modifications and structural changes may be made therein without departing from the scope of the concepts described herein and within the scope and range of equivalents of the claims.

What is claimed is:

1. A computer-implemented method comprising:
   at a collaboration server in communication with attendee devices participating in a collaboration session and configured to send data over multiple multicast channels:
      receiving information from each of the attendee devices, the information indicating hardware information, automatic multicast tunneling (AMT) relay information, AMT gateway information, autonomous system information, or network address translation information;
      grouping the attendee devices into one of a plurality of groups according to the information, each group being associated with one of the multicast channels;
      receiving a network report from at least one attendee device of at least one of the groups; and
      adjusting the multicast channel associated with the group of attendee devices represented by the network report.

2. The method of claim 1, wherein each multicast channel is a source-specific multicast (SSM) channel.

3. The method of claim 2, wherein adjusting comprises opening or closing one or more SSM channels according to the network report and currently available SSM channels.

4. The method of claim 2, wherein adjusting includes adjusting the bit rate of the SSM channel.

5. The method of claim 1, wherein the at least one attendee devices that sends the network report is a sample device of the group.

6. The method of claim 1, wherein the network report includes packet loss ratio, jitter, and/or latency information.

7. The method of claim 1, wherein the network report is received at random time intervals.

8. A collaboration server comprising:
   a network interface unit configured to enable communications with a plurality of attendee devices participating in a collaboration session and send data over multiple multicast channels;
   a memory; and
   a processor configured to:
      receive information from each of the attendee devices, the information indicating hardware information, automatic multicast tunneling (AMT) relay information, AMT gateway information, autonomous system information, or network address translation information;
      group the attendee devices into one of a plurality of groups according to their information, each group being associated with one of the multicast channels;
      receive a network report from at least one attendee device of at least one of the groups; and
      adjust the multicast channel associated with the group of attendee devices represented by the network report.

9. The collaboration server of claim 8, wherein each channel is a source-specific multicast (SSM) channel.

10. The collaboration server of claim 9, wherein the processor is configured to adjust by opening or closing one or more SSM channels according to the network report and currently available SSM channels.

11. The collaboration server of claim 9, wherein the processor is configured to adjust by adjusting the bit rate of the SSM channel.

12. The collaboration server of claim 8, wherein the at least one attendee device that sends the network report is a sample device of the group.

13. The collaboration server of claim 8, wherein the network report includes packet loss ratio, jitter, and/or latency information.

14. The collaboration server of claim 8, wherein the network report is received at random time intervals.

15. One or more non-transitory computer readable storage media of a collaboration server in communication with attendee devices participating in a collaboration session and configured to send data over multiple multicast channels to the attendee devices, the computer readable storage media being encoded with software comprising computer executable instructions, and when the software is executed, operable to:
   receive information from each of the attendee devices, the information indicating hardware information, automatic multicast tunneling (AMT) relay information, AMT gateway information, autonomous system information, or network address translation information;
   group the attendee devices into one of a plurality of groups according to their information, each group being associated with one of the multicast channels;
   receive a network report from at least one attendee device of at least one of the groups; and
   adjust the multicast channel associated with the group represented by the network report.

16. The non-transitory computer readable storage media of claim 15, wherein each multicast channel is a source-specific multicast (SSM) channel.

17. The non-transitory computer readable storage media of claim 16, wherein the computer executable instructions are operable to adjust by opening or closing one or more SSM channels according to the network report and currently available SSM channels.

18. The non-transitory computer readable storage media of claim 16, wherein the computer executable instructions are operable to adjust by adjusting the bit rate of the SSM channel.

19. The non-transitory computer readable storage media of claim 15, wherein the network report includes packet loss ratio, jitter, and/or latency information.

20. The non-transitory computer readable storage media of claim 15, wherein the network report is received at random time intervals.

* * * * *